(12) United States Patent
Sun

(10) Patent No.: US 8,451,855 B2
(45) Date of Patent: May 28, 2013

(54) TAP, LRM, RESOURCE STATE CONTROL SYSTEM AND METHOD

(75) Inventor: Desheng Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 221 days.

(21) Appl. No.: 12/743,083

(22) PCT Filed: Dec. 29, 2007

(86) PCT No.: PCT/CN2007/003971
§ 371 (c)(1),
(2), (4) Date: May 14, 2010

(87) PCT Pub. No.: WO2009/062354
PCT Pub. Date: May 22, 2009

(65) Prior Publication Data
US 2010/0239249 A1    Sep. 23, 2010

(30) Foreign Application Priority Data

Nov. 16, 2007  (CN) .......................... 2007 1 0187997

(51) Int. Cl.
*H04L 12/56* (2006.01)
(52) U.S. Cl.
USPC ........................................................ 370/419
(58) Field of Classification Search
USPC .................... 370/242, 252, 352, 389, 419
See application file for complete search history.

(56) References Cited

FOREIGN PATENT DOCUMENTS

CN        101170839 A       4/2008

OTHER PUBLICATIONS

International Search Report dated Aug. 28, 2008.

*Primary Examiner* — Man Phan
*Assistant Examiner* — Nourali Mansoury
(74) *Attorney, Agent, or Firm* — Bright IP Law Offices

(57) ABSTRACT

The present invention discloses a TAP, which comprises a resource state inputting interface, configured to be connected to termination and adaption function of transport plane, and to acquire therefrom a resource management state, a resource use state and a resource operational state; a use state outputting interface, configured to be connected to the termination and adaption function of the transport plane, and to notify it of the resource use state; a subnetwork point adding or withdrawing interface, configured to be connected to a link resource manager, and to notify it of the adding or withdrawing of the subnetwork point; a subnetwork point binding state outputting interface, configured to be connected to the link resource manager, and to notify it of subnetwork point binding state; and a subnetwork point operational state outputting interface, configured to be connected to the link resource manager, and notifying it of the subnetwork point operational state. The present invention also discloses an LRM, a resource state control system and method. By means of the present invention, the maintenance of the SNP binding state and the synchronization with the general state of resources can be achieved.

12 Claims, 4 Drawing Sheets

TAP, LRM, RESOURCE STATE CONTROL SYSTEM AND METHOD

FIELD OF THE INVENTION

The present invention relates to communication field, in particular to a Termination and Adaption Performer (TAP), a Link Resource Manager (LRM), a resource state control system and a resource state control method in Automatic Switched Optical Network.

BACKGROUND OF THE INVENTION

Transport networks such as optical networks generally comprise Optical Transport Network (OTN), Wavelength-Division Multiplexing (WDM), Synchronous Digital Hierarchy (SDH) or Synchronous Optical Network (SONET), which have already been widely applied in telecommunication field at present.

Automatic Switched Transport Network (ASTN) has become a research hotspot in the field of the transport network in recent years. The concept of the ASTN is brought forward in the ITU-T G.8080 recommendation, in which a specific Control Plane (CP) is set to achieve the function of the ASTN network. The maintenance of the binding state of each Sub-Network Point (SNP) by the TAP is described in the ITU-T G.8080 recommendation.

The X.731 issued by the CCITT (former name of the ITU-T) describes the general state of a managed object, which includes management state (including locked, unlocked and shutting down), resource use state (including idle, active and busy), and operational state (enable and disable).

After the transport network has been developed into the ASTN, the state thereof can generally not be synchronized with the general state described in the X.731 due to the lack of a perfect definition of the SNP binding state, and the lack of a notification of SNP binding state. Technical solutions enabling the maintenance of SNP binding state and the synchronization thereof with the general state described in the X.731 are therefore urgently needed, but no related solution has been brought forward so far.

SUMMARY OF THE INVENTION

With respect to the above problems, the present invention provides a Termination and Adaption Performer (TAP), a link resource manager (LRM), a resource state control system and a resource state control method to achieve the maintenance of Sub-network Point (SNP) binding state and the synchronization with general state of the X.731.

According to one embodiment of the present invention, a TAP is provided, which used in the ASTN.

The TAP comprises: a resource state inputting interface, configured to be connected to a termination and adaption function of a transport plane, and to acquire therefrom a resource management state, a resource use state and a resource operational state; a use state outputting interface, configured to be connected to the termination and adaption function of the transport plane, and to notify it of the resource use state; an SNP adding or withdrawing interface, configured to be connected to a LRM and to notify it of adding of withdrawing of the SNP; an SNP binding state outputting interface, configured to be connected to the LRM, and to notify it of the SNP binding state; and an SNP operational state outputting interface, configured to be connected to the LRM and to notify it of the SNP operational state.

Wherein, the network comprises a plurality of LRMs, and the TAP has an SNP adding or withdrawing interface, an SNP binding state inputting interface and an SNP operational state inputting interface corresponding to each of the plurality of LRMs.

According to another embodiment of the present invention, a LRM is provided.

The LRM comprises: an SNP adding or withdrawing interface, configured to be connected to a TAP, and to receive an SNP adding or withdrawing notification from the TAP; an SNP binding state inputting interface, configured to be connected to the TAP and to receive the SNP binding state notified by the TAP; and an SNP operational state inputting interface, configured to be connected to the TAP, and to receive the SNP operational state notified by the TAP.

According to another embodiment of the present invention, a resource state control system is provided, which is used in the ASTN, the system comprises: the TAP and the LRM in the above mentioned embodiments.

In this system, in the process of allocating resources to the network element where the TAP is located, the TAP allocates the SNP to a plurality of LRMs respectively, and notify them through the SNP adding or withdrawing interface, and then sets the SNP binding state of the plurality of LRMs respectively according to subsequent operations of the plurality LRMs and notify the plural LRMs of the set SNP binding state through the SNP binding state outputting interface.

Specifically, the SNP binding state comprises: an allocated state, indicating that it is permitted to bind the resources, and that the resource tags and capacities corresponding to the SNP have been allocated to the LRM; a busy state, indicating that it is permitted to bind the resources, and that the resource tags and capacities corresponding to the current SNP have been allocated to other LRMs besides the LRM of the current SNP or the management planes; a potential state, indicating that it is permitted to bind the resources, and that the resource tags and capacities corresponding to the current SNP have not been allocated; a shutting down state, indicating that the TAP notifies the LRM of returning resource tags and capacities of the corresponding SNP.

In this way, after allocating resources to the network element where the TAP is located, the TAP acquires the management state, use state and operational state of the allocated resource through the resource state inputting interface and sets the resource and SNP binding state of the plurality of LRMs to be the potential state respectively, and notifies each one of the plurality of LRMs of it through the SNP binding state outputting interface;

in the case of all SNP binding state of the plurality of LRMs are the potential state, when a control plane entity where one of the plural link resource managers is located applies for resources to the TAP, the TAP allocates the resources to the control plane entity having applied for the resources, changes the SNP binding state of the LRM of the control plane entity to which the resource is allocated from the potential state to the allocated state, changes the SNP binding state of the LRM of other control plane entities not having applied for resources from the potential state to the busy state, and respectively notifies the LRM having applied for resources and other LRMs of SNP state changes through the SNP binding state outputting interface;

Afterwards, when releasing the allocated resources, the TAP changes the SNP binding state of the LRM of the control plane entity whose resources are released from the allocated state to the shutting down state, and after successful release, further changes it to the potential state, changes the SNP binding state of other LRMs from the busy state to the potential state, and notifies the LRM having released the resources and other LRMs of the SNP state changes respectively through the SNP binding state outputting interface.

Wherein, when requiring an immediate-release of the resource, the TAP changes the SNP binding state of the LRM of the control plane entity whose resources have been released from the allocated state directly to the potential state.

Additionally, when resources are not allocated to one of the plurality of control plane entities any more, if the SNP binding state of the LRM of the control plane entity whose resources are not allocated is the busy or potential state, the TAP notifies the LRM of the control plane entity to which resources are not allocated to delete the corresponding SNPs through the SNP adding or withdrawing outputting interface.

Further, the above mentioned shutting down state includes: an immediate shutting down state, indicating that current services need to be interrupted; and an as-soon-as-possible shutting down state, indicating that services are routed before returning the resource tags and capacities.

According to another embodiment of the present invention, a resource state control method is provided, which is used in the ASTN, the method is carried out by the above mentioned resource state control system.

Wherein, in the process of allocating resources to the network element where the TAP is located, the TAP allocates the SNP to a plurality of LRMs respectively, and notifies them through the SNP adding or withdrawing interface, and then sets the SNP binding state of the plurality of LRMs respectively according to the subsequent operations of the plurality of the LRMs and notifies the plurality LRMs of the set SNP binding state through the SNP state outputting interface.

Specifically, the SNP binding state comprises: an allocated state, indicating that it is permitted to bind the resources, and that the resources tags and capacities corresponding to the current SNP have been allocated to the LRM; a busy state, indicating that it is permitted to bind the resources, and that the resource tags and capacities corresponding to the current SNP have been allocated to other LRMs besides the LRM of the current SNP or management planes; a potential state, indicating that it is permitted to bind the resources, and the resources tags and capacities corresponding to the current SNP have not been allocated; a shutting down state, indicating that the TAP notifies the LRM of returning the resources tags and capacities of the corresponding SNP.

Wherein, after allocating resources to the network element where the TAP is located, the TAP acquires the management state, use state and operational state of the allocated resource through the resource state inputting interface, and sets the resource and the SNP binding state of the plurality of LRMs to be the potential state respectively, and notifies each one of the plurality of LRMs of it through the SNP binding state outputting interface;

in the case of all SNP binding state of the plurality of LRMs are the potential state, when a control plane entity where one of the plurality LRMs is located applies for resources to the TAP, the TAP allocates the resources to the control plane entity having applied for resources, changes the SNP binding state of the LRM of the control plane entity to which the resource is allocated from the potential state to the allocated state, changes the SNP binding state of the LRM of other control plane entities not having applied for resources from the potential state to the busy state, and respectively notifies the LRM having released the resources and other LRMs of the SNP state changes through the SNP binding state outputting interface;

when releasing the allocated resources, the TAP changes the SNP binding state of the LRM of the control plane entity whose resources are released from the allocated state to the shutting down state, and after successful release, further changes it to the potential state, meanwhile changes the SNP binding state of other LRMs from the busy state to the potential state, and respectively notifies the LRM having applied for resources and other LRMs of the SNP state changes through the SNP binding state outputting interface.

Furthermore, when resources are not allocated to one of the plurality of control plane entities any more, if the SNP binding state of the LRM of the control plane entity to which resources are not allocated is the busy or potential state, the LRM of the control plane entity to which resources are not allocated is notified to delete the corresponding SNP through the SNP adding or withdrawing outputting interface.

Additionally, when requiring immediate-release of the resource, the TAP changes the SNP binding state of the LRM of the control plane entity whose resources have been released from the allocated state directly to the potential state.

By means of the above mentioned technical solutions in the present invention, the maintenance of the SNP binding state and the synchronization with the general state of the X.731 can be achieved.

BRIEF DESCRIPTION OF THE DRAWINGS

The drawings provide a further understanding of the present invention and constitute a part of the specification, which are used to explain the present invention with the embodiments of the present invention rather than to limit the present invention, wherein.

DETAILED DESCRIPTION

In the present invention, the SNP binding state is introduced based on the existing standards and technologies, and the TAP and the interacting interfaces of the LRM of each CP entity are added, and therefore effective maintenance of the binding state and the synchronization with X.731 general state can be achieved.

According to an embodiment of the present invention, a TAP is provided used in the ASTN.

Figure 1:
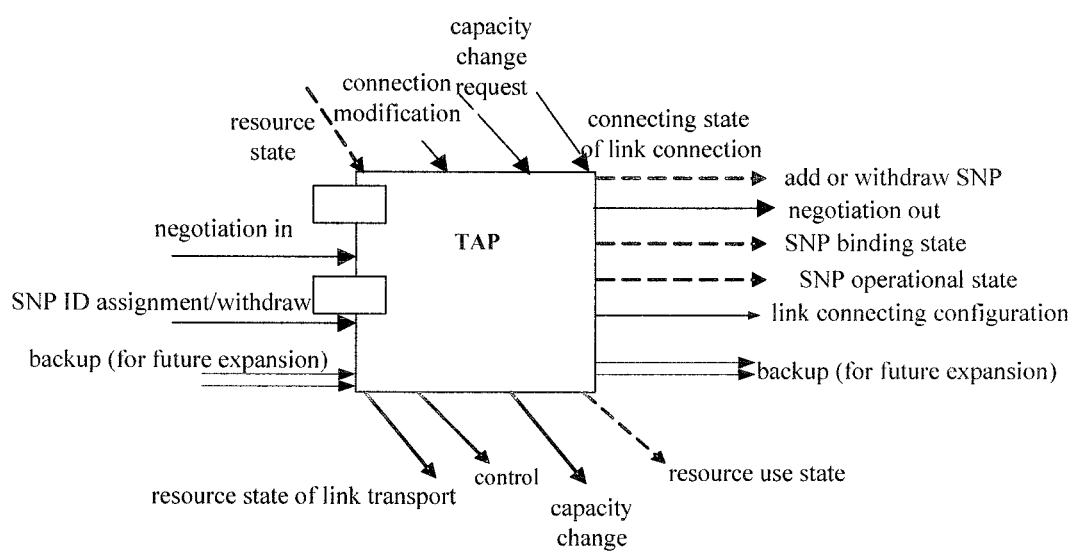
FIG. 1 is a diagram schematically showing the architecture of TAP according to an embodiment of the present invention.

As shown in FIG. 1, based on the original interfaces, or the interfaces recently added but not related to the solution of the present invention or the backup interfaces for future expansion (interfaces in real lines comprise, an SNP ID assignment/withdraw interface, a negotiation in interface, a connecting modification interface, a capacity change request interface, a connecting state interface of the link connection, a negotiation out interface, a link connecting configuration interface, a link transport resource state interface, a capacity change interface, a control interface, an inputting backup interface and an outputting backup interface for future expansion) the TAP according to the present invention further comprises: a resource state inputting interface, configured to be connected to the termination and adaption function of the transport plane and to acquire therefrom a resource management state, a resource use state and a resource operational state; a use state outputting interface, configured to be connected to the termination and adaption function of the transport plane, and to notify it of the resource use state; an SNP adding or withdrawing interface, being an interacting interface, configured to be connected to the LRM, and to notify it of the adding or withdrawing of the SNP; an SNP binding state outputting interface, configured to be connected to the LRM, and to notify it of the SNP binding state; and an SNP operational state outputting interface, configured to be connected to the LRM, and to notify it of the SNP operational state.

The interfaces shown in real lines in FIG. 1 is not described herein, for they are not associated with the technical solution of the present invention.

According to an embodiment of the present invention, an LRM is provided.

Figure 2:
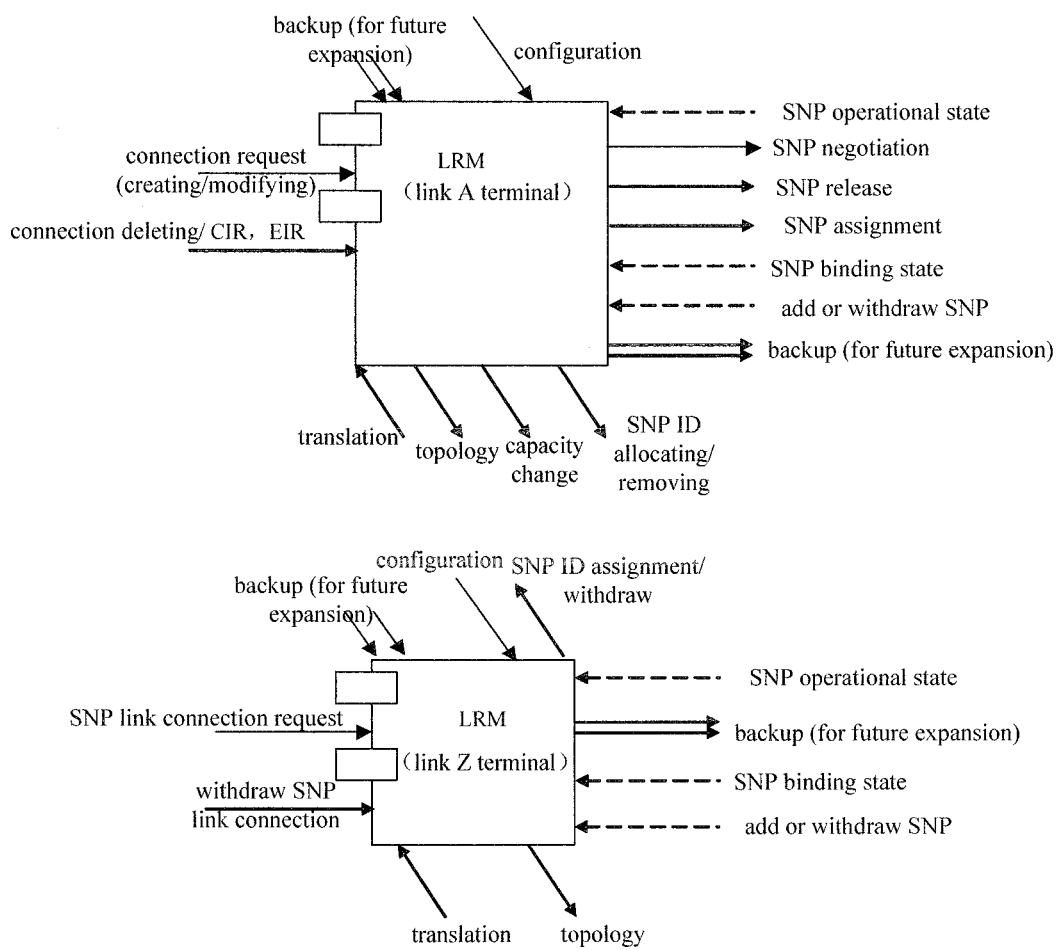
FIG. 2 is a diagram schematically showing the architecture of LRM according to the embodiments of the present invention.

As shown in FIG. 2, based on the original interfaces, or the interfaces recently added but not related to the solution of the present invention or the backup interfaces for future expansion (interfaces in real lines in FIG. 2 comprise: a connection request interface (creation/modification), a connection withdrawing interface, a configuration interface, an SNP negotiation interface, an SNP release interface, an SNP allocating interface, an SNP ID assignment/withdraw interface, a translation interface, a topology interface, a capacity change interface, an inputting backup interface and an outputting backup interface for future expansion), the LRM according to the present invention further comprises: an SNP adding or withdrawing interface, being an interacting interface, configured to be connected to the TAP, and to receive the notification of adding or withdrawing SNP from the TAP; an SNP binding state inputting interface, configured to be connected to the TAP, and to receive the SNP binding state notified by the TAP; and an SNP operational state inputting interface, configured to be connected to the TAP, and to receive the SNP operational state notified by the TAP.

The interfaces shown in real lines in FIG. 2 is not described herein, for they are not associated with the technical solution of the present invention.

It is noted that the object of showing two LRMs in FIG. 2 lies in explaining that the first terminal (also called A terminal) performs different functions as the last terminal (also called Z terminal) does. However, as there are a plurality of links in an ASTN, both A terminal (beginning terminal) of some links and Z terminal (end terminal) of other links are under the management of the LRM of a node. Therefore, the LRM of a node generally performs the functions of both LRM A terminal and LRM Z terminal.

Figure 3:
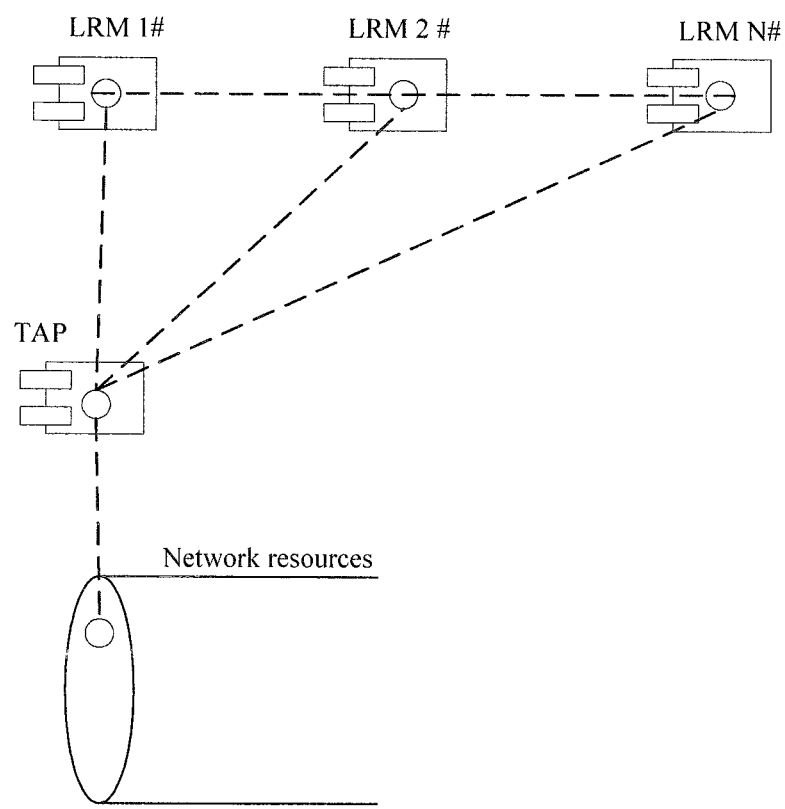
FIG. 3 is a schematic view of the corresponding relationships between a TAP and a LRM according to an embodiment of the present invention.

FIG. 3 shows the relationships among the network resources of transport plane (TP for short) the TAP and the LRM. As shown in FIG. 3, in a network there may include plural LRMs, and a TAP has an SNP adding or withdrawing interfaces, an SNP binding state inputting interfaces and an SNP operational state inputting interface corresponding to each of the plural LRMs. that is, the TAP and the LRMs are of a one-to-multiple relationship. The network resources, such as link terminals, mainly serve to perform the functions of termination and adaption, and maintain the general state, that is, management state, resource use state and operational state described in X.731. The TAP can be responsible for managing and configuring the network resources, controlling the allocation of the SNP and the capacities, controlling the binding state of SNP and resources (i.e. the SNP binding state), and acquiring the management, the resource use and the operational state of resources described in X.731 in real time. The LRM of each CP entity is responsible for managing allocation of the SNP and the capacities, and acquiring the resource operational state and the SNP binding state in real time.

According to an embodiment of the present invention, a resource state control system is provided in the ASTN, the system comprises the TAP and the LRM in the above mentioned embodiments.

In this system, in the process of allocating resources to the network element where the TAP is located, the TAP allocates the SNP to a plurality of LRMs respectively, and notify them through the SNP adding or withdrawing interface, and then sets SNP binding state of the plural LRMs respectively according to the subsequent operations of the plural LRMs and notify the plural LRMs of the set SNP binding state through the SNP binding state outputting interface.

Specifically, the SNP binding state comprises: an allocated state, indicating that it is permitted to bind the resources, and that the resource tags and capacities corresponding to the current SNP have been allocated to the LRM; a busy state, indicating that it is permitted to bind the resources, and that the resource tags and capacities corresponding to the current SNP have been allocated to other LRMs besides the LRM of the current SNP or the management planes; a potential state, indicating that it is permitted to bind the resources, and that the resource tags and capacities corresponding to the current SNP have not been allocated; an shutting down state, indicating that the TAP notifies the LRM of returning resource tags and capacities of the corresponding SNP.

In this way, after allocating resources to the network element where the TAP is located, the TAP acquires the management state, use state and operational state of the allocated resource through the resource state inputting interface and sets the resource and the SNP binding state of the plurality of LRMs to be the potential state respectively, and notifies each one of the plurality of LRMs of it through the SNP binding state outputting interface;

in the case of all SNP binding states of the plural LRMs are the potential state, when a CP entity where one of the plural LRMs is located applies for resources to the TAP, the TAP allocates the resources to the CP entity having applied for the resources, changes the SNP binding state of the LRM of the CP entity to which the resource is allocated from the potential state to the allocated state, changes the SNP binding state of the LRM of other CP entities not having applied for resources from the potential state to the busy state, and respectively notifies the LRM having applied for resources and other LRMs of SNP state changes through the SNP binding state outputting interface;

Afterwards, when releasing the resources allocated, the TAP changes the SNP binding state of the LRM of the CP entity whose resources are released from the allocated state to the shutting down state, and after successful release, further changes it to the potential state, changes the SNP binding state of other LRMs from the busy state to the potential state, and notifies the LRM having released the resources and other LRMs of SNP state changes respectively through the SNP binding state outputting interface.

Wherein, when requiring immediate-release of the resources, the TAP changes the SNP binding state of the LRM of the CP entity whose resources have been released from the allocated state directly to the potential state.

Additionally, when resources are not allocated to one of the plural CP entities any more, if the SNP binding state of the LRM of the CP entity to which resources are not allocated is the busy state or potential state, the TAP notifies the LRM of the CP entity to which resources are not allocated to delete the corresponding SNPs through the SNP adding or withdrawing outputting interface.

Further, the above mentioned shutting down state includes: an immediate shutting down state, indicating that current services need to be interrupted; and an as-soon-as-possible shutting down state, indicating that services are routed before returning the resource tags and the capacities.

In the actual processing process, the SNP state may be first defined as follows:

ALLOCARED: binding is permitted and the resource tags and the capacities corresponding to the current SNP have been allocated to the current LRM;

BUSY: binding is permitted and the resource tags and the capacities corresponding to the current SNP have been allocated to other LRMs or the management planes;

POTENTIAL: binding is permitted and the resource tags and the capacities corresponding to the current SNP have not been allocated;

SHUTTING DOWN: the TAP notifies the resource tags and the capacities corresponding to the current SNP must be returned in a prescribed time interval, which can comprises an immediate-situation (interruption of the current services), an as-soon-as-possible situation (re-routing the current services before returning) and other situations.

Figure 4:
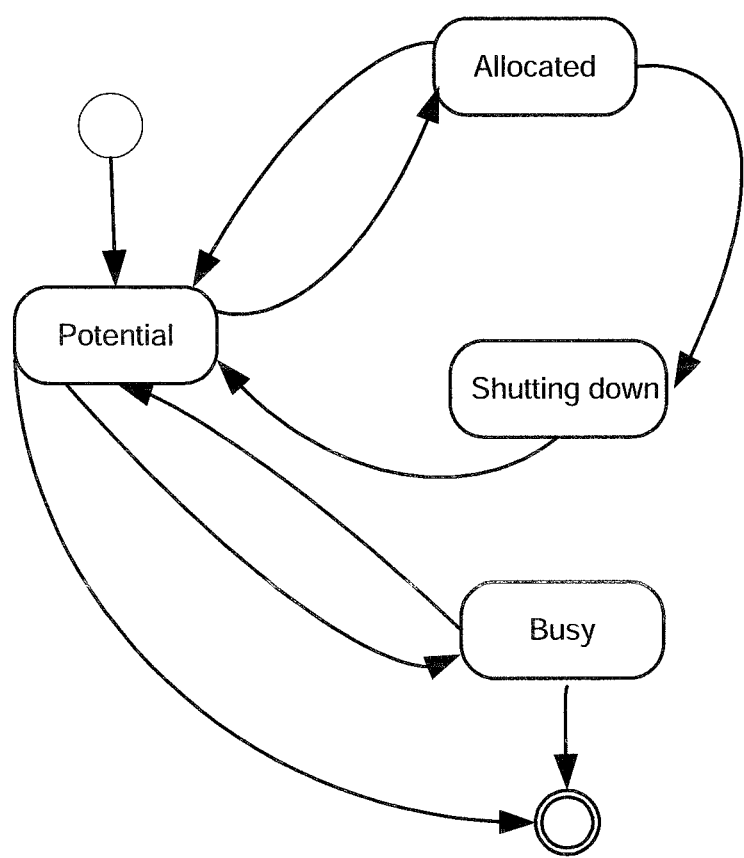
FIG. 4 is a schematic view of the transition of the SNP binding state according to an embodiment of the present invention.

The transition mode in FIG. 4 may be referred to as the process of maintaining SNP binding state by the TAP according to limited manners of state machines, which is described as follows:

1. When the resources are allocated to CP entities for using, the TAP allocates corresponding SNP to the LRM of each CP entity, and the SNP binding state of each LRM enters "POTENTIAL";
2. the TAP allocates the resource tags and the capacities corresponding to SNPs according to the request of any one of the LRMs, and the SNP binding state of the LRMs whose resources are allocated are changed form "POTENTIAL" to "ALLOCATED"; the SNP binding state of other LRMs are changed from "POTENTIAL" to "BUSY".
3. if the SNP binding state of the LRM is "ALLOCATED", and the TAP requires the SNPs of the LRM to release resources, the SNP binding state of LRM is changed from "ALLOCATED" to "SHUTTING DOWN", and when the LRM completes operations such as resources releasing, the SNP binding state is changed from "SHUTTING DOWN" to "POTENTIAL";
4. if the SNP binding state of the LRM is "ALLOCATED", and TAP requires the SNPs of the LRM to release the resources immediately, the SNP of the LRM releases the resources immediately, and the binding state is set to be "POTENTIAL";
5. if the SNP binding state of the LRM is "BUSY", after the SNPs of the LRM occupying resources have released resources, the SNP binding state of all LRMs are changed to "POTENTIAL";
6. if the SNP binding state of the LRM is "BUSY" or "POTENTIAL", when the resources are not allocated to the CP for using any more, the TAP deletes the SNPs of the LRMs of the CP entities.

It can be seen from the above mentioned descriptions that the maintenance of the SNP binding state and the synchronization with the general state described in the X.731 can be achieved through set explicit binding state of the SNP and the resources, adding interfaces between the TAP and the LRM and providing the SNP binding state machines, which has the advantages of simplicity and reliability.

The present invention will be described in combination with the embodiments as follows:

the VC4 resource is assumed to be allocated to an ASTN network element, in which two CP entities, CP1 and CP2, are running. Wherein, the CP1 creates a connection by means of the resource and then deletes it. The CP2 creates a connection by means of the resource, at last, the ASTN network element is not allowed to use the VC4 resource any more, and the CP2 deletes the connection.

The solution comprises the following steps:

step 1, the VC4 resource is allocated to an ASTN network element, the TAP of which acquires the state of that resource from the interface of the X.731 state of resources, and allocates SNPs to LRMs of CP1 and CP2 respectively, for example, the SNP of the CP1 is SNP1, and the SNP of the CP2 is SNP2, and notifies each LRM1 and LRM2 through "adding or withdrawing SNP" interface. The TAP sets the binding state of the SNP1 and the SNP2 to be "potential", and notifies the LRM1 and the LRM2 through "SNP binding state" interface; meanwhile the TAP notifies each LRM of the operational state of current resources through the SNP binding state outputting interface;

Step 2, the CP1 creates a connection, and applies to a TAP for allocating resources to SNP1 through LRM1; the TAP allocates the resources to SNP1, changes the SNP1 binding state from "POTENTIAL" to "ALLOCATED", changes SNP2 binding state from "POTENTIAL" to "BUSY", and notifies the LRM1 and the LRM2 through the SNP binding state outputting interface;

Step 3, the CP1 deletes the connection created in step 2, and applies to the TAP for immediate-release of the SNP1 resources through the LRM1; the TAP releases SNP1 resources, and changes the SNP1 binding state from "ALLOCATED" to "POTENTIAL", The TAP changes the SNP2 binding state from "BUSY" to "POTENTIAL", and notifies the LRM1 and the LRM2 through the SNP binding state outputting interface;

Step 4, the CP2 creates a connection, and applies to the TAP for allocating resources to the SNP2 through the LRM2; the TAP allocates resources to SNP2, changes the SNP1 binding state from "POTENTIAL" to "BUSY", changes the SNP2 binding state from "POTENTIAL" to "ALLOCATED", and notifies the LRM1 and the LRM2 through the SNP binding state outputting interface;

Step 5, as the VC4 in step 1 is not allocated to the ASTN network element any more, the TAP changes the SNP2 binding state from "ALLOCATED" to "SHUTTING DOWN", and notifies the LRM2 through "SNP binding state" interface; the LRM2 initiates to delete the connection in step 4 and notifies the TAP after successful deletion of the connection; the TAP sets binding state of the SNP1 and the SNP2 to be "POTENTIAL"; afterwards, the TAP notifies the LRM1 and the LRM2 through the SNP adding or withdrawing interface, and removes the SNP1 and the SNP2.

According to a further embodiment of the present invention, there is provided a resource state control method in the ASTN, which is carried out by the above mentioned resource state control system.

Wherein, in the process of allocating resources to the network element where the TAP is located, the TAP allocates the SNPs to a plurality of LRMs respectively, and notify them through the SNP adding or withdrawing interface, and then sets the SNP binding state of the plural LRMs respectively according to the subsequent operations of the plural LRMs and notify the plural LRMs of the netted SNP binding state through the SNP binding state outputting interface.

Specifically, the SNP binding state comprises: an allocated state, indicating that it is permitted to bind, the resources and the resource tags and the capacities corresponding to the current SNP have been allocated to the LRM; a busy state, indicating that it is permitted to bind the resources, and the resource tags and the capacities corresponding to the current SNP have been allocated to other LRMs besides the LRM of the current SNP or the management planes; a potential state, indicating that it is permitted to bind the resources, and the resource tags and the capacities corresponding to the current SNP have not been allocated; a shutting down state, indicating that the TAP notifies the LRM of returning the resource tags and the capacities of the corresponding SNP.

Wherein, the TAP, after allocating resources to the network element where the TAP is located, acquires the management state, use state and operational state of the allocated resource through the resource state inputting interface, and sets the resource and the SNP binding state of the plural LRMs to be the potential state respectively and notifies each one of the plural LRMs of it through the SNP binding state outputting interface;

In the case of all SNP binding state of the plural LRMs are the potential state, when a CP entity where one of the plural LRMs is located applies for resources to the TAP, the TAP allocates resources to the CP entity having applied for resources, changes the SNP binding state of the LRM of the CP entity to which the resource is allocated from the potential state to the allocated state, changes the SNP binding state of the LRM of other CP entities not having applied for resources from the potential state to the busy state, and respectively notifies the LRM having released the resources and other LRMs of the SNP state changes through the SNP binding state outputting interface;

when releasing the allocated resources, the TAP changes the SNP binding state of the LRM of the CP entity whose resources are released from the allocated state to the shutting down state, and after successful release, further changes it to the potential state, meanwhile changes the SNP binding state of other LRMs from the busy state to the potential state, and respectively notifies the LRM having applied for resources and other LRMs of the SNP state has changed through the SNP binding state outputting interface;

Furthermore, when the resources are not allocated to one of the plural CP entities any more, if the SNP binding state of the LRM of the CP entity to which resources are not allocated is the busy state or the potential state, the LRM of the CP entity to which the resources are not allocated is notified to deleted the corresponding SNP through the SNP adding or withdrawing outputting interface.

Additionally, when requiring immediate-release of the resource, the TAP changes the SNP binding state of the LRM of the CP entity whose resources have been released from the allocated state directly to the potential state.

All in all, it can be seen that the maintenance of the SNP binding state and the synchronization with general state of the X.731 can be achieved in the present invention by defining the binding state of the SNP and the resources, and adding interfaces between the TAP and the LRM. The present invention is easy to be carried out and highly reliable.

Above description is only to illustrate the preferred embodiments but not to limit the present invention. Various alterations and changes to the present invention are apparent to those skilled in the art. The scope defined in the claims shall comprise any modification, equivalent substitution and improvement within the spirit and principle of the present invention.

The invention claimed is:

1. A resource state control system, used in an Automatic Switched Transport Network (ASTN), the resource state control system comprising:

a Termination and Adaption Performer (TAP), comprising:
  a resource state inputting interface, configured to be connected to a termination and adaption function of a transport plane, and to acquire therefrom a resource management state, a resource use state and a resource operational state;
  a use state outputting interface, configured to be connected to the termination and adaption function of the transport plane and to notify it of the resource use state;
  a subnetwork point (SNP) adding or withdrawing interface, configured to be connected to a Link Resource Manager (LRM) and to notify it of an adding or withdrawing of the SNP;
  an SNP binding state outputting interface, configured to be connected to the LRM and to notify it of an SNP binding state; and
  an SNP operational state outputting interface, configured to be connected to the LRM and to notify it of the SNP operational state; and
a plurality of LRMs, each comprising:
  the SNP adding or withdrawing interlace, configured to be connected to the TAP and to receive the SNP adding or withdrawing notification from the TAP;
  an SNP binding state inputting interface, configured to be connected to the TAP and to receive the SNP binding state notified by the TAP; and
  an SNP operational state inputting interface, configured to be connected to the TAP and to receive the SNP operational state notified by the TAP;
wherein, in allocating resources to a network element where the TAP is located, the TAP allocates SNPs to the plurality of LRMs, respectively, and notifies them through the SNP adding or withdrawing interface, and then sets the SNP binding state of the plurality of LRMs respectively according to subsequent operations of the plurality of LRMs and notifies the plurality of LRMs of the set SNP binding state through the SNP binding state outputting interface.

2. The resource state control system according to claim 1, wherein the SNP binding state comprises: an allocated state, indicating that it is permitted to bind the resources, and that resource tags and capacities corresponding to a current SNP have been allocated to the LRM; a busy state, indicating that it is permitted to bind the resources, and that the resource tags and capacities corresponding to the current SNP have been allocated to other LRMs besides the LRM of the current SNP or management planes; a potential state, indicating that it is permitted to bind the resources, and that the resource tags and capacities corresponding to the current SNP have not been allocated; a shutting down state, indicating that the TAP notifies the LRM of returning resource tags and capacities of the corresponding SNP.

3. The resource state control system according to claim 2, wherein, after allocating the resources to the network element where the TAP is located, the TAP acquires the management state, use state and operational state of the allocated resource through the resource state inputting interface, and sets the resources and the SNP binding state of the plurality of LRMs to be the potential state respectively, and notifies each one of the plurality of LRMs of it through the SNP binding state outputting interface; in the case of all SNP binding state of the plurality of LRMs are the potential state, when a control plane entity where one of the plurality of LRMs is located applies for resources to the TAP, the TAP allocates the resources to the control plane entity having applied for the resources, changes the SNP binding state of the LRM of the control plane entity to which the resource is allocated from the potential state to the allocated state, changes the SNP binding state of the LRM of other control plane entities not having applied for resources from the potential state to the busy state, and respectively notifies the LRM having applied for resources and the other LRMs of SNP state changes through the SNP binding state outputting interface; when releasing, the resources allocated, the TAP changes the SNP binding state of the LRM of the control plane entity whose resources are released from the allocated state to the shutting down state, and after successful release, further changes it to the potential state, changes the SNP binding state of other LRMs from the busy state to the potential state, and notifies the LRM having released the resources and the other LRMs of the SNP state changes respectively through the SNP binding state outputting interface.

4. The resource state control system according to claim 3, wherein, when requiring an immediate-release of the resources, the TAP changes the SNP binding state of the LRM of the control plane entity whose resources have been released from the allocated state directly to the potential state.

5. The resource state control system according to claim 3, wherein, when resources are not allocated to one of a plurality of control plane entities any more, if the SNP binding state of the LRM of the control plane entity whose resources are not allocated is the busy state or potential state, the TAP notifies the LRM of the control plane entity to which resources are not allocated to delete corresponding SNPs through the SNP adding or withdrawing outputting interface.

6. The resource state control system according to claim 3, wherein, the shutting down state includes: an immediate shutting down state, indicating that current services need to be interrupted; and an as-soon-as-possible shutting down state, indicating that services are routed before returning the resource tags and capacities.

7. The resource state control system according to claim 1, wherein the TAP has an SNP adding or withdrawing interface, the SNP binding state inputting interface and the SNP operational state inputting interface corresponding to each of the plurality of LRMs.

8. A resource state control method, used in an Automatically Switched Transport Network (ASTN), for allocating resources to a network element where a Termination and Adaption Preformer (TAP) is located, the method comprising:

allocating Subnetwork Points (SNPs), by the TAP, to a plurality of Link Resource Managers (LRMs), respectively;

notifying the plurality of LRMs through an SNP adding or withdrawing interface of adding or withdrawing of the SNPs; and setting SNP binding states of the plurality of LRMs, respectively, according to subsequent operations of the plurality of LRMs and notifying the plurality of LRMs of the set SNP binding states through an SNP binding state outputting interface;

wherein the Termination and Adaption Performer (TAP) comprises:

a resource state inputting interface, configured to be connected to a termination and adaption function of a transport plane, and to acquire therefrom a resource management state, a resource use state and a resource operational state;

a use state outputting interface, configured to be connected to the termination and adaption function of the transport plane and to notify it of the resource use state;

the subnetwork point (SNP) adding or withdrawing interface, configured to be connected to a Link Resource Manager (LRM) and to notify it of the adding or withdrawing of the SNP;

the SNP binding state outputting interface, configured to be connected to the LRM and to notify it of an SNP binding state; and an SNP operational state outputting interface, configured to be connected to the LRM and to notify it of an SNP operational state;

and wherein each of the LRMs comprises:

the SNP adding or withdrawing interface, configured to be connected to the TAP and to receive the SNP adding or withdrawing notification from the TAP;

an SNP binding state inputting interface, configured to be connected to the TAP and to receive the SNP binding state notified by the TAP; and an SNP operational state inputting interface, configured to be connected to the TAP and to receive the SNP operational state notified by the TAP;

wherein, in allocating resources to a network element where the TAP is located, the TAP allocates SNPs to the plurality of LRMs, respectively, and notifies them through the SNP adding or withdrawing interface, and then sets the SNP binding state of the plurality of LRMs respectively according to subsequent operations of the plurality of LRMs and notifies the plurality of LRMs of the set SNP binding state through the SNP binding state outputting interface.

9. The resource state control method according to claim 8, wherein the SNP binding state comprises:

an allocated state, indicating that it is permitted to bind the resources, and that resource tags and capacities corresponding to a current SNP have been allocated to the LRM;

a busy state, indicating that it is permitted to bind the resources, and that the resource tags and capacities corresponding to the current SNP have been allocated to other LRMs besides the LRM of the current SNP or the management planes;

a potential state, indicating that it is permitted to bind the resources, and the resource tags and capacities corresponding to the current SNP have not been allocated; and a shutting down state, indicating that the TAP notifies the LRM of returning the resource tags and capacities of the corresponding SNP.

10. The resource state control method according to claim 9, after allocating resources to the network element where the TAP is located, the method further comprising:

the TAP acquiring a management state, use state and operational state of an allocated resource through the resource state inputting interface, setting the resource and the SNP binding state of the plurality of LRMs to be the potential state, respectively, and notifying each one of the plurality of LRMs of it through the SNP binding state outputting interface;

in the case of all SNP binding state of the plurality of LRMs are the potential state, when a control plane entity where one of the plurality of LRMs is located applies for resources to the TAP, the TAP allocating the resources to the control plane entity having applied for resources, changing the SNP binding state of the LRM of the control plane entity to which the resource is allocated from the potential state to the allocated state, changing the SNP binding state of the LRM of other control plane entities not having applied for resources from the potential state to the busy state, and respectively notifying the LRM having released the resources and other LRMs of the SNP state changes through the SNP binding state outputting interface;

when releasing the resources allocated, the TAP changing the SNP binding state of the LRM of the control plane entity whose resources are released from the allocated state to the shutting down state, and after successful release, further changing it to the potential state, meanwhile changing the SNP binding state of other LRMs from the busy state to the potential state, and respectively notifying the LRM having applied for resources and other LRMs of the SNP state changes through the SNP binding state outputting interface.

11. The resource state control method according to claim 9, wherein when resources are not allocated to one of a plurality of control plane entities any more, if the SNP binding state of the LRM of the control plane entity to which resources are not allocated is the busy state or the potential state, the LRM of the control plane entity to which the resources are not allocated is notified to delete corresponding SNP through the SNP adding or withdrawing outputting interface.

12. The resource state control method according to claim 9, wherein when requiring immediate-release of the resources, the TAP changes the SNP binding state of the LRM of the control plane entity whose resources have been released from the allocated state directly to the potential state.

* * * * *